UNITED STATES PATENT OFFICE 1,923,031

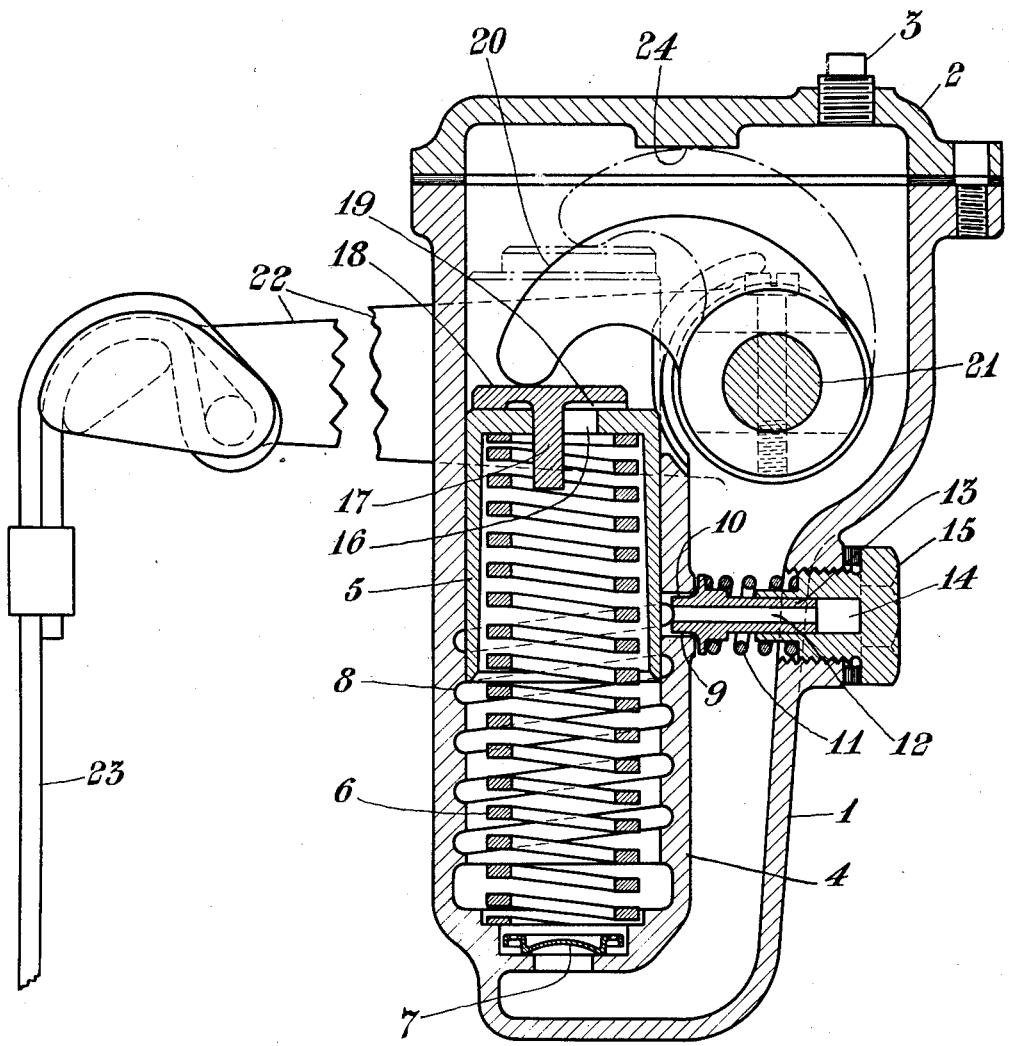

HYDRAULIC SHOCK ABSORBER

Johan Gunnar Everstam and Edit Amalia Everstam, née Ericsson, Stockholm, Sweden, assignors to Aktiebolaget Svenska Stötdämparefabriken, Stockholm, Sweden, a Manufacturing Company of Sweden Application June 12, 1930, Serial No. 460,759, and in Sweden June 13, 1929

2 Claims. (Cl. 267—8)

The present invention relates to a hydraulic shock absorber for motor vehicles and the like of the kind in which a piston movable in a liquid containing cylinder attached, for instance, to the frame of the vehicle, is actuated by a member connected, for instance, to the axle of the vehicle, to force the liquid out from the cylinder through an outflow or relief port in the same, which port is located in a flute or channel provided between the piston and the cylinder in such manner that the active length of said flute from the relief port to the chamber in the cylinder inside the piston is successively and gradually increased during the inward stroke of the piston in the cylinder.

The present invention consists broadly in that the flute is provided in the cylinder bore in such manner that when moving inwards in the cylinder the piston gradually covers said flute. This arrangement renders it possible to provide a flow controlling valve in the relief port, and it also renders it possible to make the flute of the required length so that the resistance to the flow of the liquid will mainly consist of the frictional resistance in the flute, and the resistance to the flow will thus be increased in close correspondence to the increase of the active length of the flute during the inward stroke of the piston. The action of the shock absorber will thus become more powerful in proportion as the load on the same is increased.

An embodiment of a shock absorber according to the invention is illustrated by way of example in the accompanying drawing, in vertical section.

The shock absorber consists of a casing 1 having a cover 2 provided with a filling opening 3 for the liquid, preferably oil. Provided within the casing 1 is a cylinder 4 in which a piston 5 is movable, and interposed between said piston 5 and the bottom of the cylinder is a coil spring 6 which tends to move the piston 5 out of the cylinder, that is to say, upwards as viewed in the drawing. Provided in the bottom of the cylinder is a suction valve 7 which opens inwards to the cylinder during the upward stroke of the piston in order to admit into the cylinder the liquid contained in the casing 1 around the cylinder.

Provided in the cylinder bore is a channel or flute 8 which is of helical spiral shape, in the embodiment illustrated, and which extends from the bottom of the cylinder upwards to a point which is normally covered by the piston 5. Provided in the cylinder wall at this point is a port 9 which leads to the chamber in the casing 1 outside the cylinder, and in said port there is a valve 10 which opens towards said chamber and which is urged against the orifice of said port 9 by a spring 11. The valve 10 is provided with a through passage 12, and the portion 13 of the valve remote from the cylinder 4 has a less diameter than the diameter of the port 9 and slides in a bore 14 in a screw plug 15 screw-threaded in the wall of the casing 1.

In the embodiment illustrated, the piston 5 is provided at its upper end with an aperture 16 which is traversed by a pin or lug 17 projecting from a plate 18 slidable on the outer end surface of the piston, said plate being provided in its lower surface which bears against the surface of the piston, with a groove 19 which forms a restricted relief port.

The plate 18 is engaged by the free end of an arm 20 which is secured to a shaft 21 which is journalled in the casing 1 and to the end of which projecting outside the casing a lever 22 is secured.

As is well known, the purpose of a shock absorber is to check or cushion the relative movement of the vehicle frame and wheel axle which is caused by the compression and expansion of the vehicle springs when the wheels of the vehicle engage an obstruction or other irregularities of the road surface. The casing 1 is, therefore, attached either to the vehicle frame or to the wheel axle, while the lever 22 is connected to the other of said two parts. In the embodiment illustrated, the casing 1 is assumed to be attached to the vehicle frame, and the lever 22 to be connected to the wheel axle in a suitable manner, for instance by means of a band 23.

If a spring of the vehicle is compressed, so that the wheel axle and the vehicle frame are caused to approach each other, the band 23 slackens so that the spring 6 can force the piston 5 upwards in the cylinder 4 from the normal or intermediate position shown with full-drawn lines in the drawing, thereby turning the arm 20 and thus also the lever 22 upwards.

This movement is limited by the arm 20 finally coming to rest against an abutment 24 on the inside of the cover 3, as shown with dot and dash lines in the drawing. During this upward movement of the piston 5, oil is drawn into the cylinder 4 through the bottom valve 7. When the vehicle spring again forces the vehicle frame and wheel axle away from each other, the lever 22 is of course pulled downwards, so that the arm 20 forces the piston 5 downwards in the cylinder and compresses the spring 6. The bottom valve 7 closes immediately. The oil in the cylinder 4 is thus put under pressure. If during the upward movement of the lever 22 the piston 5 has reached its upper position, shown in dot and dash lines, the port 9 is uncovered. During the downward stroke of the piston the oil will first be forced out through the restricted relief passage 19, but if the speed at which the vehicle frame and the wheel axle are separated, and thus, the speed at which the lever 22 is moved, is too high to allow the oil sufficient time to escape through said passage 19, the oil pressure in the cylinder will be increased, until finally it overcomes the tension of the spring 11 and opens the valve 10, so that the oil can flow out directly through the port 9. During its continued downward stroke the piston shuts off the direct communication between said port 9 and the chamber below the piston, so that afterwards communication takes place through the flute 8 the active length of which will, of course, be increased in proportion as the piston moves downwards.

Consequently, the frictional resistance in the flute 8 is also increased and thus also the resistance to the flow of the liquid, and therefore, also the counter pressure of the liquid on the piston.

It will thus be seen, that the greater the force which moves the vehicle frame and the wheel axle away from each other, that is, the greater the pressure which forces the piston downwards in the cylinder, and thus, the higher the speed at which said piston moves, the more powerful becomes the counter action of the shock absorber, and the more efficient its operation, which is a desideratum in all shock absorbers. In this manner the parts of the shock absorber are also prevented from being moved with great force to such position as to cause a hard blow, for instance of the piston against the cylinder bottom, or of the end of the arm 20 against the cylinder wall, which might cause breakage of the shock absorber.

The passage 12 in the valve 10 and the bore 14 which forms a pressure chamber serve partly to balance the pressure from the cylinder on the end of the valve projecting into the port 9, so that a less spring pressure is required on the valve, and thus a spring of smaller dimensions may be used than would otherwise be required.

The plate 18 serves to produce less friction between the arm 20 and the piston 5. Said plate will follow the end of the arm 20, and will thus slide to and fro on the end surface of the piston, and it will be understood that the sliding surface between the plate 18 and the end of the piston is well lubricated from the interior of the piston. Obviously, the groove or relief passage 19 may be provided in the end surface of the piston, instead of in the plate 18.

The invention is of course not limited to the embodiment above described and illustrated in the drawing. The flute 8 need of course not have spiral shape, as it can have any other suitable shape.

We claim:

1. In a hydraulic shock absorber for motor vehicles and the like, the combination of a liquid containing cylinder, a piston reciprocable in said cylinder, said piston having an aperture in its end, a plate covering said aperture and slidable on the end of said piston, means on said plate forming with said piston a restricted relief port from said aperture, and means engaging said plate to actuate said piston to move it into said cylinder so as to compress the liquid in the same.

2. In a hydraulic shock absorber for motor vehicles and the like, the combination of a liquid containing cylinder, a piston reciprocable in said cylinder, said piston having an aperture therein, a plate slidable on said piston, covering said aperture and having a projecting portion of smaller cross section than said aperture received within the same to limit said sliding movement and means engaging said plate to move said piston in said cylinder to compress said liquid, thereby causing said plate to slide on said piston.

JOHAN GUNNAR EVERSTAM.
EDIT AMALIA EVERSTAM,
NÉE ERICSSON.